Jan. 3, 1928.
T. W. W. FORREST
1,654,799
PROCESSING OF DRIED BERRIES ESPECIALLY THOMPSON SEEDLESS RAISINS
Filed July 13, 1926
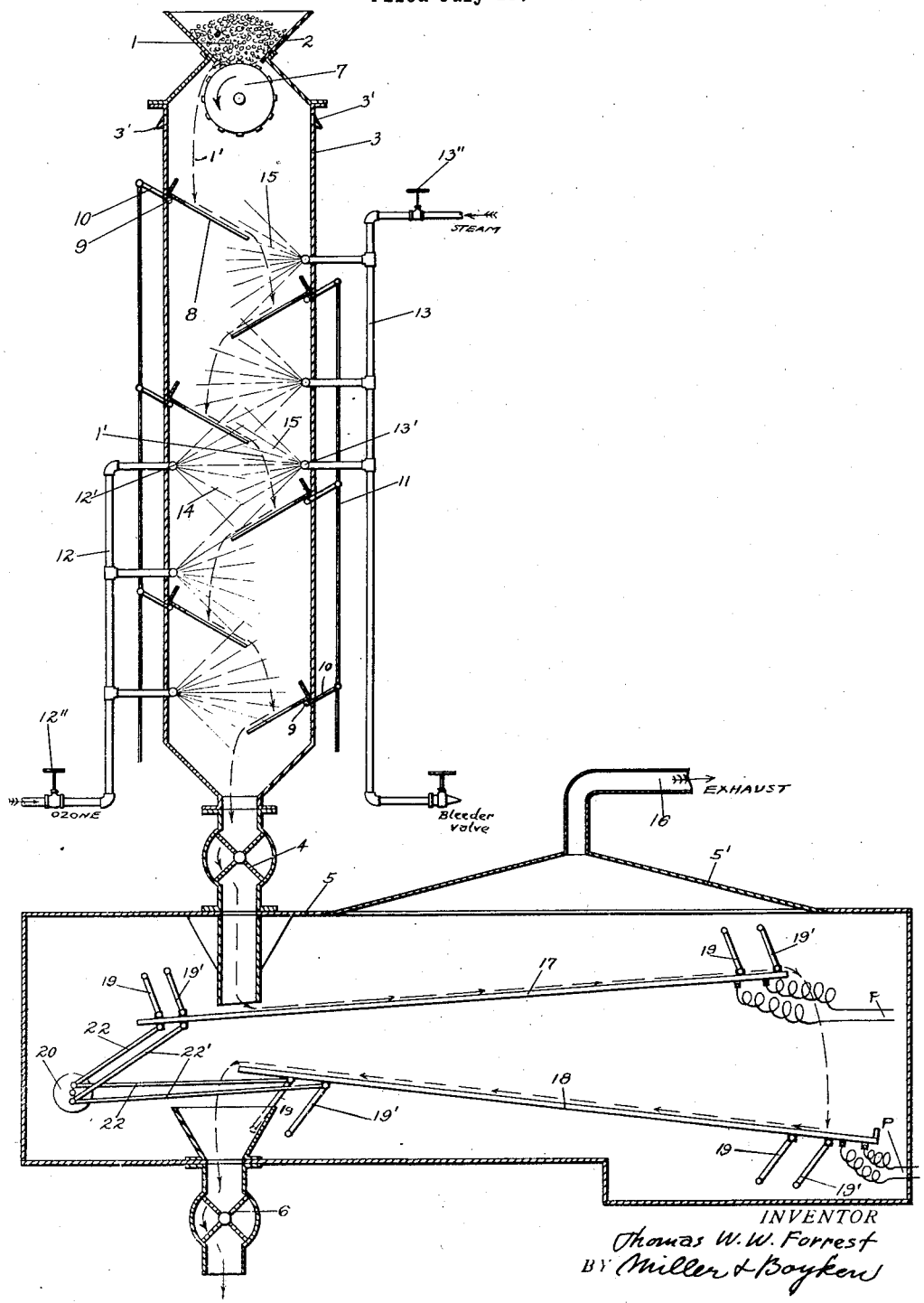
INVENTOR
Thomas W. W. Forrest
BY Miller & Boyken
ATTORNEY Patented Jan. 3, 1928.

1,654,799

UNITED STATES PATENT OFFICE.

THOMAS W. W. FORREST, OF FRESNO, CALIFORNIA, ASSIGNOR TO SUN-MAID RAISIN GROWERS OF CALIFORNIA, OF FRESNO, CALIFORNIA, A COOPERATIVE ASSOCIATION OF CALIFORNIA.

PROCESSING OF DRIED BERRIES ESPECIALLY THOMPSON SEEDLESS RAISINS.

Application filed July 13, 1926. Serial No. 122,080.

This invention relates to the processing of dried berries, and especially the dried raisin berries known as Thompson seedless raisins.

The objects of the invention are to provide a treatment for such dried berries which will result in a product of superior quality.

Briefly described the process comprises treating the dried fruit berries under special conditions to the action of wet steam and ozone or ozonized air in concentrated form, after which the berries are protected from the air while subject to very quick drying preferably on a hot metal grill.

The process may be applied to various food berries with good results, but especially so to Thompson seedless raisins and thereby overcoming the objections to sulphur treatment.

The drawings hereto show in diagrammatic form the arrangement of apparatus for carrying out the complete process, and the process is hereunder claimed both in its complete form as well as specifically to the upper or ozone treatment portion of the process, while the lower or special drying stage of the process is specifically claimed in my copending application for patent simultaneously filed herewith and bearing Serial Number 122,081 as this latter part of the process may have value independent of the process in the drying of food products.

The apparatus for carrying out the process as herein indicated is also specifically claimed in my two copending applications filed simultaneously herewith under Serial Numbers 122,082 and 122,083, finally maturing as Patents 1,626,805 and 1,632,180 respectively.

In the drawing accompanying this specification one form of apparatus for carrying out the process is shown tho it will be evident to those skilled in the art that the carrying out of the process is in no manner limited to such specific apparatus. The view is a vertical sectional representation somewhat in diagrammatic form.

Applying the process to dried Thompson seedless raisins, the berries 1 are fed from a hopper 2 to the upper end of a vertical casing 3 for falling therethrough and treatment in transit and discharge therefrom by a rotary sealing gate 4 into a lower casing 5 for further treatment and final discharge from a second sealing gate 6.

Just below the lower end of the hopper 2 is a feeder control drum 7 rotated by any suitable controlled means not shown, for the purpose of determining the amount of berries dropped into the casing 3 and causing the berries to fall in a ribbon like stream, and also for maintaining the upper end of the casing substantially sealed against the outer atmosphere.

Within the casing 3 are deflecting shelves 8 projecting from opposite sides of the casing, the shelves slanting downwardly toward the center of the casing so that the stream of falling berries will bound from one shelf to the next in the manner indicated by the dotted lines 1'.

The shelves instead of being of plain sheet metal are preferably made of wires or pins in the form of a fine rake so that the gases used in treatment can freely act on the berries even while successively on the shelves, and the shelves are preferably pivoted at 9 to the casing and provided each with an arm 10 on the pivot shaft connected to control rods 11 so that the angle of the shelves may be varied to suit the requirements.

At opposite sides of the casing are pipes 12—13 which may be within the casing or be arranged with suitable branches 12'—13' within the casing perforated to emit blasts directed toward the central vertical axis of the casing through which the berries are falling.

Both pipes are provided with control valves 12" and 13" and through one of the pipes say 12 is delivered blasts of ozone 14, or ozonized air preferably in highly concentrated condition, while through the other pipe 13 is delivered blasts of moist steam 15 at about 285 degrees Fahrenheit. Any condensed water in the steam pipe is blown off through the bleeder valve shown on the lower end of the pipe. At the upper end of the casing 3 at 3' are narrow slots provided with downwardly extending covers so arranged as to provide for escape of condensed moisture or excessive vapor.

The meeting of these agencies among the stream of falling berries has a remarkable effect thereon, but whether due to some special action of ozone in its meeting with the hot steam or the combination of some of the ozone in the formation of $H_2O_2$ I have not determined, but the quality of the berries is greatly improved by the treatment as the berries at once change to very even attractive light tint, and are of much finer flavor without any of the sulphur flavor as in berries which have previously been sulphured.

The treatment requires but a few seconds but if the product is at once discharged to atmosphere a degradation ensues, and which is overcome by a rapid drying at a relatively high temperature in casing 5 preferably under the influence of rarefied conditions through application of a gentle exhaust through the pipe 16.

In casing 5 the berries are received on the lower end of a shaker grill 17 and which through its motion causes them to travel upward in a rolling action for discharge over its upper end to the lower end of a second similar grill 18 for repetition of the action until final discharge into the gate 6 for ejection from the apparatus.

The grills 17 and 18 are preferably made of longitudinal bars spaced close enough to prevent the berries from falling through and are heated preferably by an electric current P to a temperature of about 750° F.

The grills are suspended on links 19, 19' and are shaken by the rods 22, 22' connected to an eccentric or crank 20.

The berries travel upward on the grills to insure a rolling action rather than a sliding action otherwise produced and which would cause the berries to burn, the angle of the rocking links 19 together with the amount of shaking motion delivered from the eccentric 20 determines the speed of the berries in their upward rolling travel.

Suitable means for actuating the gates 4 and 6 and drum 7 as well as eccentric 20 in proper relation is to be understood without being specifically shown in the diagram.

I claim:

1. The method of processing raisins which comprises subjecting them to combined action of steam and ozone while preventing agglutination of the raisins.

2. The method of processing raisins which comprises subjecting them to combined action of steam and ozone whilst falling through space.

3. The method of processing raisins which comprises subjecting them while in motion to opposed blasts of ozone and steam.

4. The method of processing dried fruit berries which comprises subjecting them while in motion to opposed blasts of ozone and steam substantially at the meeting point of the blasts.

5. The method of processing dried fruit berries which comprises subjecting them to an atmosphere of ozone and steam and thereafter subjecting the berries to a quick hot drying temperature.

6. The method of processing dried fruit berries which comprises subjecting them to an atmosphere of ozone and steam and thereafter subjecting the berries to a quick hot drying temperature elevated to about 750° F.

7. The method of processing dried fruit berries which comprises subjecting them to an atmosphere of ozone and steam and thereafter subjecting the berries to a quick hot drying temperature whilst rolling the berries.

8. The method of processing raisins which comprises subjecting them to the action of highly ozonized air and steam, followed by drying the raisins at a higher temperature.

9. The method of processing raisins which comprises subjecting them to the action of highly ozonized air and steam, followed by drying the raisins at a higher temperature by giving the raisins a rolling against hot metal.

10. The method of processing raisins which comprises subjecting them to the action of highly ozonized air and steam, followed by drying the raisins at a higher temperature by giving the raisins a rolling against hot metal while exhausting the heated vapor therefrom.

THOMAS W. W. FORREST.